Feb. 9, 1954
J. MAILLART
2,668,395
MACHINE FOR THE MANUFACTURE OF HOLLOW GLASS ARTICLES
Filed Nov. 28, 1950
2 Sheets-Sheet 1
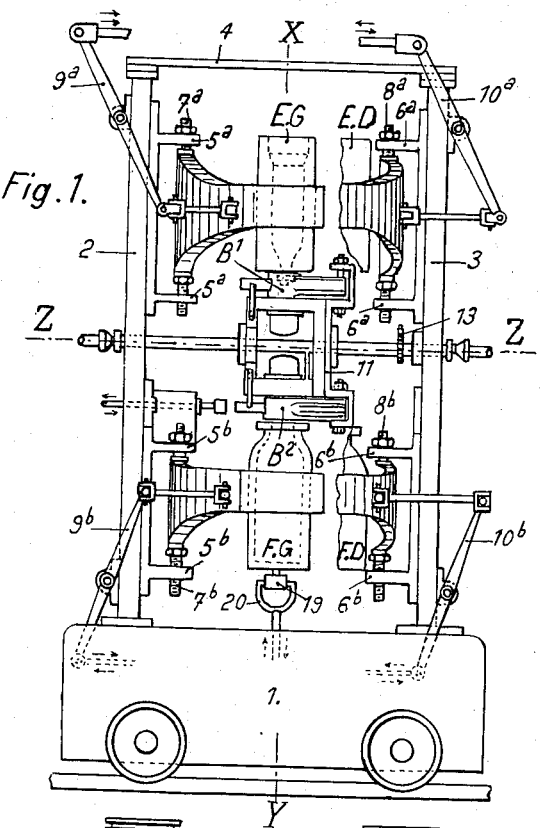
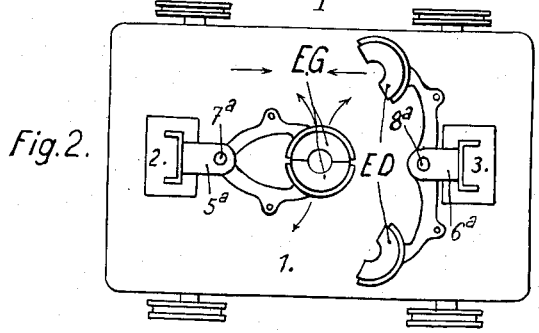
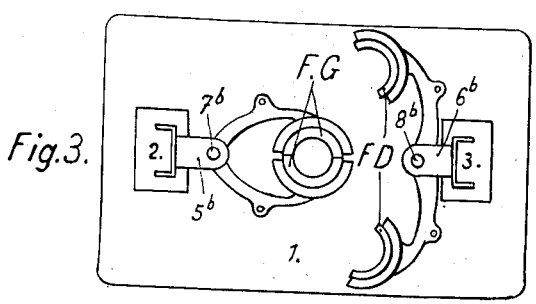
INVENTOR
JEAN MAILLART
By
Haseltine, Lake & Co.
AGENTS Feb. 9, 1954
J. MAILLART
2,668,395
MACHINE FOR THE MANUFACTURE OF HOLLOW GLASS ARTICLES
Filed Nov. 28, 1950
2 Sheets-Sheet 2
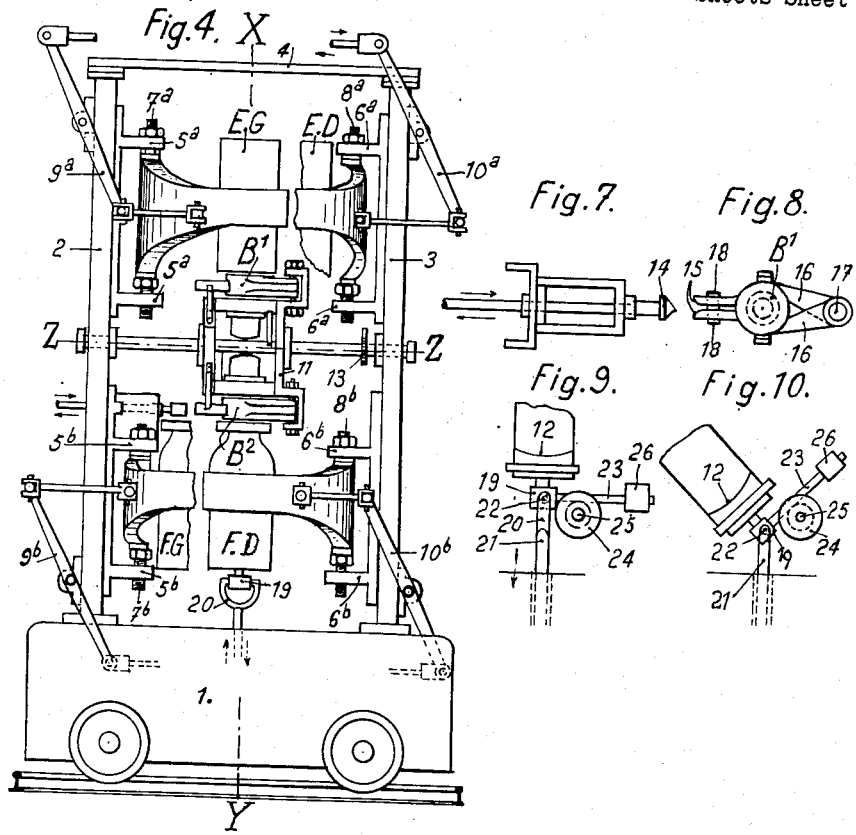
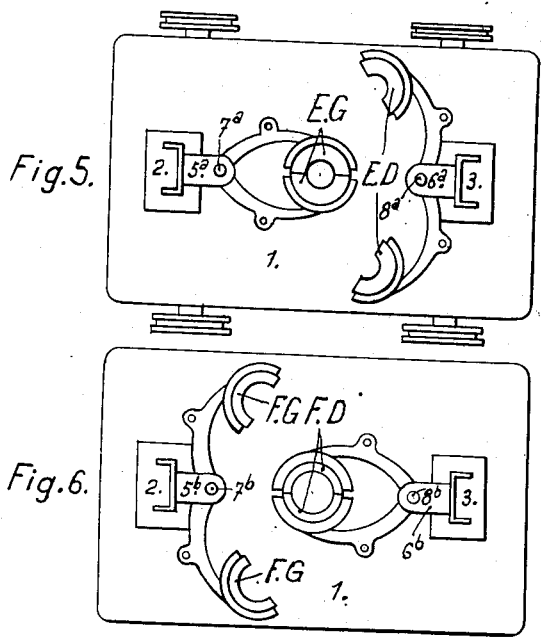
INVENTOR
JEAN MAILLART
By:
Hauctim, Lake + Co.
AGENTS Patented Feb. 9, 1954

2,668,395

UNITED STATES PATENT OFFICE 2,668,395

MACHINE FOR THE MANUFACTURE OF HOLLOW GLASS ARTICLES

Jean Maillart, Paris, France

Application November 28, 1950, Serial No. 197,883
Claims priority, application France December 3, 1949

2 Claims. (Cl. 49—9)

This invention relates to machines for the manufacture of hollow glass articles such as bottles, flasks and the like, of the type in which the article is obtained by the co-operation of a roughing mould in which the glass parison is formed, with a finishing mould to which this parison is transferred through the intermediary of a neck mould, and which blows the article to its final form.

The improvements which have been proposed for this type of machine or which were made therein immediately it appeared have always tended to produce optimum output by a more or less judicious choice of the grouping of the three moulds comprised in a set or by the combination of a number of sets of moulds.

To this end, machine designers have endeavoured to make the roughing and finishing moulds operate simultaneously. The most striking arrangements include in particular the Boucher machine (according to French Patent No. 312,474), which comprises two neck moulds, two roughing moulds and a finishing mould, the Barrez machine (according to French Patent No. 346,816) which comprises a roughing mould, a finishing mould and two neck moulds, and the Grote machine (according to British Patent No. 16,625/1899), which comprises two sets of moulds (two roughing moulds, two neck moulds and two finishing moulds). However, in these machines, the rate of production is not sufficiently rapid to maintain the moulds, and especially the neck moulds, at a suitable temperature.

On the other hand, the known machines, in which the designers proposed to ensure simultaneous operation of various moulds, have only provided incomplete and frequently complicated solutions of this problem, principally because their kinematic conception necessitates imparting to the moulds certain displacements requiring the assistance of mechanical devices which in themselves are complex and the provision of which is in turn necessitated by the requirement to maintain permanent connections between the moulds and vacuum or compressed-air generators which either form or blow the parison. The present invention resides in a machine of the type in question which is distinguished by the fact that it ensures to the maximum extent simultaneous working of the glass in the roughing and finishing moulds, while operating to some extent in a static manner as regards the said moulds.

The machine according to the invention is, in fact, characterised in that it comprises, in stages from top to bottom, a pair of roughing moulds, a pair of neck moulds and a pair of finishing moulds, all of which are centred, in their closing positions, on a common axis forming the general axis of the machine, the roughing and finishing moulds being actuated exclusively with opening and closing movements resulting from the rotation of their respective shells about vertical axes, which are situated, for each pair, on either side of the general axis, while the pair of neck moulds can carry out together rotations of 180° around a horizontal axis encountering the said general axis.

A machine according to the invention for the manufacture of glass articles is illustrated in the accompanying drawings, in which:

Figure 1 shows the machine in vertical elevation in a method of operation in which the roughing and finishing moulds are simultaneously controlled, Figures 2 and 3 are diagrammatic plan views corresponding to the positions of Figure 1 for the roughing and finishing moulds respectively, Figures 4 to 6 correspond to Figures 1 to 3 respectively for another method of operation, also with simultaneous control and Figures 7–10 show, by way of example, additional parts of the machine.

The machine comprises a frame 1 on which are mounted two uprights 2—3 connected at the top by a cross member 4. The cross member comprises a central ring which permits the glass delivered by the gatherer to fall into the roughing mould. Secured to the uprights are supports $5a$—$5b$ and $6a$—$6b$ in which are fitted vertical pins $7a$—$7b$ and $8a$—$8b$.

Mounted on the pins $7a$—$7b$, through the intermediary of mould carriers, are a roughing mould E. G. and a finishing mould F. G. respectively.

Similarly, a roughing mould E. D. and a finishing mould F. D. respectively are mounted on the pins $8a$—$8b$ through the intermediary of mould carriers.

The two pairs of moulds E. G.—F. G. and E. D.—F. D. are situated on opposite sides of a vertical axis X—Y and their arrangement is such that in the closed position of their shells these moulds are centred on the axis X—Y, which is the general axis of the machine. The only movement imparted to these moulds is that corresponding to the opening and the closing of their shells.

These four moulds may be closed around two neck moulds $B^1$ and $B^2$ respectively, each of which is also actuated with opening and closing movements and which, in their stopping positions, are also centred on the general axis X—Y, which is thus common to the three pairs of moulds.

Moreover, the neck moulds may carry out together rotations of 180° about a horizontal axis Z—Z which encounters the general axis X—Y.

The opening and closing movements of the roughing moulds and finishing moulds are controlled by levers $9a$—$9b$ and $10a$—$10b$ actuated at suitable instants with oscillatory movements about their respective axes by any suitable means. The roughing moulds receive their glass charges by any suitable means.

The machine may operate in two different manners.

In the first form of operation, called "simultaneous control" operation, the opening and closing movements, one for the roughing mould and the other for the finishing mould, co-operating successively in the manufacture of one and the same article, take place synchronously, these moulds belonging either to a common side group (crossed controls) or respectively to each of the two side groups (direct controls).

In the second form of operation, called the "individual control" operation, the respective opening and closing movements of the roughing mould and of the finishing mould engaged in the said co-operation depend upon individual controls.

In the two forms of operation, the relative arrangement of the roughing moulds with respect to one another necessarily implies that the closing of one corresponds to the opening of the other, and likewise for the finishing moulds.

In the simultaneous control operation, these two methods of working are possible.

According to a first method of working the roughing and finishing moulds mounted on the same upright 2 open and close together and the same is the case with the roughing and finishing moulds mounted on the other upright 3.

In this first method of working, which is called "direct control" operation, a parison formed and worked in the roughing mould of one side group is blown in the finishing mould of the other side group. The roughing mould E-G works for the finishing mould F-D and the mould E-D for the mould F-G. In this direct control working, the products of the moulds are therefore "crossed," that is to say, the co-operation of the moulds is diagonal.

In a second method of working, which is called "crossed control" working, the roughing mould of one side group opens and closes simultaneously with the finishing mould of the other side group.

In this second method of working, a parison formed and worked in the roughing mould of one side group is blown in the finishing mould of the same side group. The roughing mould E-G works for the finishing mould F-G and the mould E-D works for the mould F-D.

In this method of working with cross controls, the products of the machine therefore result not from a diagonal co-operation, but from a lateral co-operation of the moulds.

This second method of working is preferable to the first because in particular, on changes in the form of the bottles or the like, the operators know automatically that there corresponds to the left-hand roughing mould, for example for blowing the bottle, the left-hand finishing mould, and likewise for the right-hand moulds.

The operation of the machine with simultaneous control will first be described.

The first method of working, called "direct control" working is illustrated in Figures 1 to 3.

When the machine is started, the action of a compressed-air distributor produces, through one of the pairs of levers (in this case, the levers $9a$—$9b$), the simultaneous closing of the moulds of one side group. In the example, the mould E-G closes around the neck mould $B^1$ and, simultaneously, the mould F-G closes around the neck mould $B^2$.

The right-hand moulds E-D and F-D are simultaneously opened by the pair of levers $10a$—$10b$.

A glass charge having been delivered into the roughing mould E-G and worked in this mould in the usual way (opening, elongation and marvering), the moulds E-G and F-G open at the same time.

By means of any suitable device, one example of which will later be described, the frame 11, which supports the pair of neck moulds $B^1$—$B^2$ receives an impulse which starts the rotation of these moulds together about the axis Z—Z and this rotation continues by gravity under the driving action of the pendulous mass formed by the parison carried by the neck mould $B^1$, which mass is freed by the opening of the mould F-G.

When the frame 11 has completed a rotation of 180°, the parison, which is then vertically suspended from the mould $B^1$, the place of which has been taken by the mould $B^2$, lies flush with a finishing base 12 (Figures 9 and 10).

The finishing mould F-D is then closed around the neck mould $B^1$ on the general axis X—Y, enclosing the parison. Simultaneously, the roughing mould E-D closes again about the neck mould $B^2$ on the same general axis.

The blowing of the parison, which has come from the roughing mould E-G into the finishing mould F-D, takes place in the ordinary manner, either by means of compressed air or by means of a vacuum, while a second parison is received and worked in the roughing mould E-D.

When the glass article has been blown in the mould F-D and is ready to be expelled from this mould, the latter opens simultaneously with the roughing mould E-D, under the action of the levers $10b$—$10a$ respectively. At the same time, the shells of the neck mould $B^1$ open and release the flange of the neck. The manufactured article thus rests on the base 12. This base receives, through any suitable means, a vertical reciprocating motion and a tilting movement which ensures on the one hand the disengagement of the ring and on the other hand the expulsion of the blown article.

During this expulsion, a further rotation of the frame 11 has brought the moulds $B^1$—$B^2$ to their initial position, the first in the position of co-operation with the mould E-G, which closes on it to form a further parison, the second in the position of co-operation with the mould F-G to which it has just delivered, for blowing, the parison which has just been formed in the mould E-D.

The first working cycle is thus completed and it will be seen that, in this first method of working, a parison formed in the roughing mould of one side group is blown in the finishing mould of the other side group.

The second method of working, called "cross control working," which also arises out of the simultaneous control operation, is illustrated in Figures 4 to 6.

It will be assumed that at the starting of the machine the roughing mould E–D has received the glass charge necessary for the formation of a parison and that as soon as this work of formation has been completed the mould E–D has opened. By rotation of the neck mould B² about the axis Z—Z the parison has been brought into the finishing mould F–D which has closed about this neck mould (positions shown in Figures 4 to 6).

The closing of the finishing mould F–D about the neck mould B² corresponds to the closing of the roughing mould E–G about the neck mould B¹.

While the operations necessary for the blowing of the parison which has just been delivered thereto take place in the mould, the operations of shaping the parison being formed in the roughing mould E–G are simultaneously effected.

Thereafter, during the second part of the cycle, the roughly formed article, which has been formed in the mould E–G, will be blown in the mould F–G.

It will be seen that in this second method of working, also with simultaneous control, a parison formed in the roughing mould of a side group is blown in the finishing mould of the same side group.

To conclude regarding the simultaneous control operation, assuming that the cooling of the moulds is effected in a sufficiently perfect manner to make it possible to disregard considerations of temperature, the glass-making times of the roughing moulds and of the finishing moulds— co-operating either diagonally in the first method of working called "direct control" working or laterally in the second method of working called "crossed control" working—can therefore be exactly the same. Consequently, the machine affords, in simultaneous control operation, the remarkable advantage that the only idle times in the output are the times necessary for the opening and closing movements of the moulds and for the rotation of the neck moulds, since an operative finishing mould corresponds constantly, in both cases, to an operative roughing mould.

Another form of control, which can also be applied to the machine, is that called "individual control" operation, that is to say, one in which the opening and closing movements of the roughing and finishing moulds are individually controlled by the various levers 9a—9b and 10a—10b. All the variants of the opening and closing periods, both with regard to the initial instant and with regard to the duration of these periods, are possible as a function of the variable glass-making times which may be required for the types of articles in the course of manufacture. For example, the roughing moulds may remain open longer than the finishing moulds if the blowing time of the article in the course of manufacture is longer than that required for the formation of the parison, which permits in particular of ensuring better cooling of the roughing mould in question and hardening of the article manufactured in the finishing mould. It will be understood that this individual control operation can be applied either by the methods called "direct control methods" or by those called "crossed control" methods. This possibility gives the machine remarkable flexibility with regard to the various manufactures which may have to be performed therein.

It will be understood that the machine will be provided with auxiliary parts and devices conforming to the various movements required for the control of the opening and closing of the shells of the roughing and finishing moulds, the periodical rotation of the neck moulds through 180°, the opening and closing thereof and the displacements of the finishing base. All these movements may be produced by the means usually employed in the glassmaking art without departing from the scope of the invention. The following description will therefore be confined to a number of simple auxiliary mechanical devices which may be advantageously incorporated in the machine.

The rotation of the pair of neck moulds may be initiated by an impulse imparted, at the necessary instants, to a ratchet wheel 13, the rotation of the pair of neck moulds involving rotation of the shaft on which they are mounted, which shaft will be tubular on either side of a solid centre part, which permits alternate connection of the neck moulds with the means employed for blowing the parisons when these moulds are in the position of co-operation with either the finishing mould or the roughing mould, while it should be noted that the said blowing means may be either a source of compressed air or a vacuum generator, according to one or other of the techniques currently employed for the blowing of the parisons.

Moreover, the opening of the neck moulds may be controlled (Figures 7 and 8) by the controlled advance of a plunger 14 penetrating at suitable instants between the arms 15—15 of a neck mould carrier 16—16, so as to move the shells of the said mould apart by causing them to pivot about their pin 17, and to release the flange of the ring, leaf springs 18—18 re-closing the moulds after this release.

The vertical movements of the finishing base 12 for the expulsion of the finished article may be controlled by means of a device shown in Figures 9 and 10.

For the downward movement, a base carrier 19 is lowered under the action of a fork 20 which is in turn mounted on a rod 21 sliding vertically in the frame. During this lowering, the base carrier tilts about a horizontal pin 22 extending through the fork 20, to which pin a lever 23 connected to the base carrier is articulated. This lever rests constantly on a roller 24, which turns about a fixed pin 25 and carries a counter-weight 26 which causes the return of the base 12 to its initial position, after the blown article has been expelled from this base by the descent and inclination of the latter.

The return of the base to its initial position enables it to receive, for blowing, the fresh parison which accompanied it in its rotation about the horizontal axis Z—Z while the finishing base was being lowered and inclined.

I claim:

1. A machine for the manufacture of hollow glass articles such as bottles, flasks and the like, comprising a pair of roughing moulds each constituted by two shells, a pair of axially aligned neck moulds, and a pair of finishing moulds each constituted by two shells, said roughing moulds, neck moulds and finishing moulds being arranged in superposed relationship with the finishing moulds at the lowest level and said neck moulds at an intermediate level between said roughing and finishing moulds, means mounting said neck moulds for rotation from a stationary position about an axis which is perpendicular to said axis of alignment of the neck moulds, means mounting the shells of the roughing moulds and finishing moulds for rotation about axes located in a plane passing along the axis of alignment of the neck moulds in said stationary position, said axes being parallel to said axis of alignment and spaced laterally therefrom so that each of said roughing and finishing moulds, in its closed position, is centered on said axis of alignment of said neck moulds, means for imparting to said roughing and finishing moulds exclusively opening and closing movements resulting from the rotation of their respective shells; and means for imparting to said pair of neck moulds rotations of 180° about said axis of rotation thereof during the opening and closing movements of said roughing and finishing moulds.

2. A machine according to claim 1, further comprising control means for effecting the synchronous opening and closing movements of said roughing and finishing moulds so that one of said roughing moulds opens and closes with one of said finishing moulds and the other roughing and finishing moulds open and close simultaneously with each other and alternately with respect to said one roughing mould and said one finishing mould.

JEAN MAILLART.

References Cited in the file of this patent

UNITED STATES PATENTS

| Number | Name | Date |
|---|---|---|
| 704,055 | Leistner | July 8, 1902 |
| 2,388,876 | Smith | Nov. 13, 1945 |

FOREIGN PATENTS

| Number | Country | Date |
|---|---|---|
| 11,214 | Great Britain | May 16, 1903 |